(12) United States Patent
Ebisawa (10) Patent No.: US 6,363,050 B1
(45) Date of Patent: Mar. 26, 2002

(54) SWITCHING CONTROL IN COLD STANDBY TYPE OF DUPLEX TRANSMISSION SYSTEM

(75) Inventor: Akizumi Ebisawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/184,542

(22) Filed: Nov. 2, 1998

(30) Foreign Application Priority Data

Mar. 12, 1998 (JP) .......................................... 10-061792

(51) Int. Cl.$^7$ ............................................. H04L 12/26
(52) U.S. Cl. ....................................... 370/216; 370/250
(58) Field of Search .............................. 370/242, 352, 370/241, 244, 216, 250, 217, 219, 220, 373, 377, 384, 410, 426

(56) References Cited

U.S. PATENT DOCUMENTS

| | | | | |
|---|---|---|---|---|
| 4,597,079 A | * | 6/1986 | Aoki et al. ................. | 370/220 |
| 5,408,462 A | * | 4/1995 | Opoczynski ................ | 370/220 |
| 5,535,191 A | * | 7/1996 | Park ........................... | 370/228 |
| 5,570,345 A | * | 10/1996 | Kaprielian et al. .......... | 370/228 |
| 5,796,717 A | * | 8/1998 | Shinbashi et al. ........... | 370/216 |

FOREIGN PATENT DOCUMENTS

| | | |
|---|---|---|
| JP | 3-226024 | 10/1991 |
| JP | 4-357724 | 12/1992 |
| JP | 7-83796 | 3/1995 |

* cited by examiner

Primary Examiner—Wellington Chin
Assistant Examiner—William Schultz (74) Attorney, Agent, or Firm—Rosenman & Colin LLP (57) ABSTRACT

To accomplish a cold standby type of transmission system where circuit switching is carried out with known causes, provided is a transmission system comprising a first and second transmission-signal processing circuits each of which is configured by combining a plurality of types of packages each having a detecting circuit for detecting an alarm indicative of detection of an failure in each package; a switching control circuit for controlling switching between the first and second transmission-signal processing circuits; a first interface circuit connected with both the first transmission-signal processing circuit and the switching control circuit; and a second interface circuit connected with both the second transmission-signal processing circuit and the switching control circuit. The switching control circuit has an element for receiving a switching trigger signal provided without being routed the first and second interface circuits, the switching trigger corresponding to the alarm, and an element for issuing a switching command toward the first and second interface circuits in response to the reception of the switching trigger signal. And each of the first and second interface circuits has an element for acquiring the alarm output of the detecting circuit of either one of the first and second transmission-signal processing circuits which is connected with either one of the first and second interface circuits in cases where the connected transmission-signal processing circuit is in operation when the switching command is given, the detecting circuit outputting the alarm regardless of generation of the failure if the connected transmission-signal processing circuit is in a standby state, and an element for performing control which makes the connected transmission-signal processing circuit switch into the standby state after the acquisition of the alarm output.

4 Claims, 11 Drawing Sheets

FIG. 1

PRIOR ART

SWITCHING CONTROL IN COLD STANDBY TYPE OF DUPLEX TRANSMISSION SYSTEM

BACKGROUND OF THE INVENTION

The present invention relates to a transmission system, in particular, to the transmission system employing a cold standby technique.

Conventionally, transmission systems incorporating two-system transmission-signal processing circuits therein are known, wherein if some abnormality occurs in one transmission-signal processing circuit in operation, the other transmission-signal processing circuit is put into operation as a substitution. Among such transmission systems, some systems employ a cold standby technique that part of one standby-side transmission signal processing circuit holds a non-operation state to save consuming power and/or to elongate the longevity of circuit elements.

Figure 1:
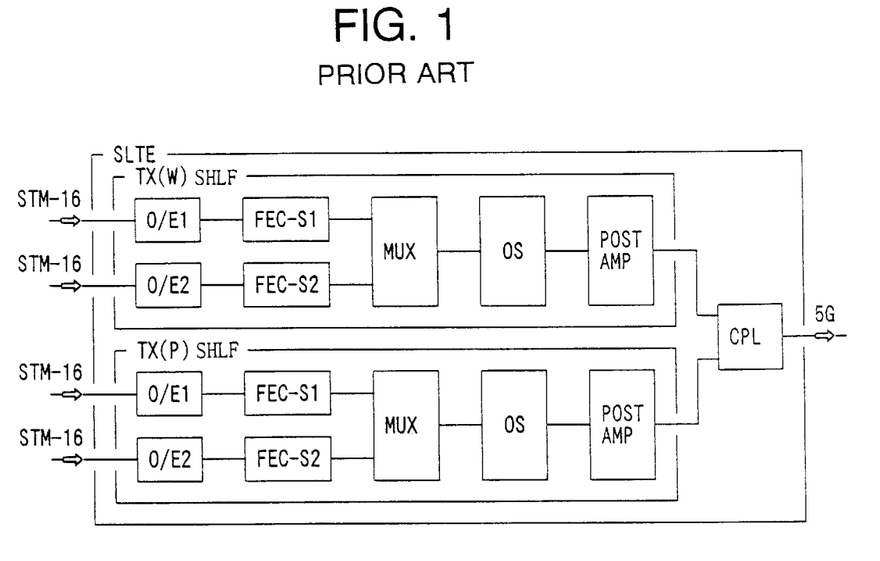
FIG. 1 is a schematic block diagram showing a conventional cold standby type of duplex transmission system.

For example, as shown in FIG. 1, there is known a system which outputs a signal of approximately 5 Gbps by combining two signals on STM (Synchronous Transfer Mode)-16. This system, which is referred to as SLTE, has a TX shelf (i.e., transmission-signal processing circuit) put into a standby state. The shelf has an OS package including a semiconductor laser (hereinafter referred to as LD) put into an off state.

As is known, in this type of SLTE, each package incorporated in each TX shelf is given the function of outputting an alarm when some failure is caused in the package itself. Using the outputted alarm, a not-shown switching control circuit included within the SLTE switches TX shelves.

Figure 2:
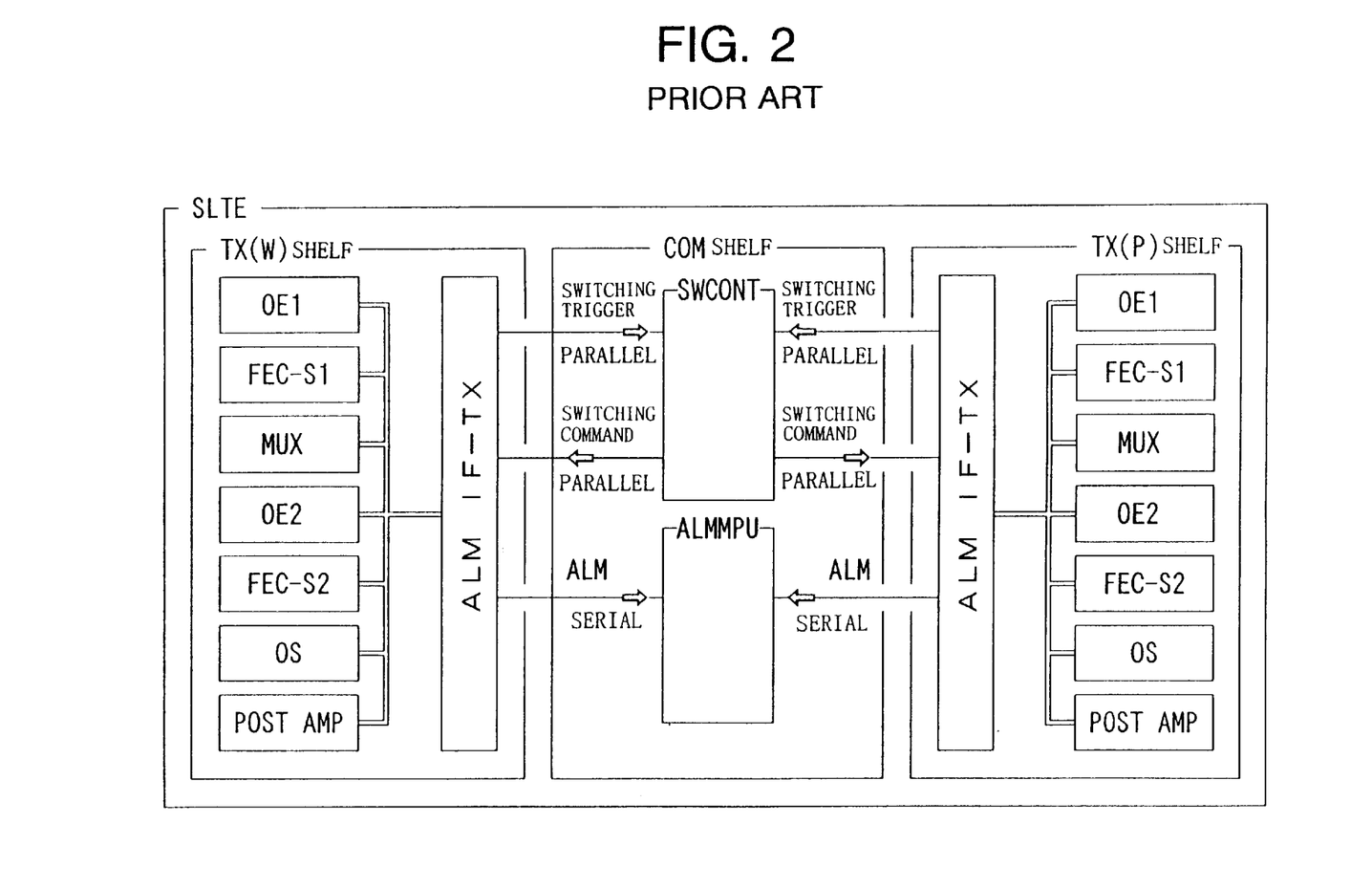
FIG. 2 is a block diagram for describing the switching operation of one type falling into the conventional transmission system.
Figure 3:
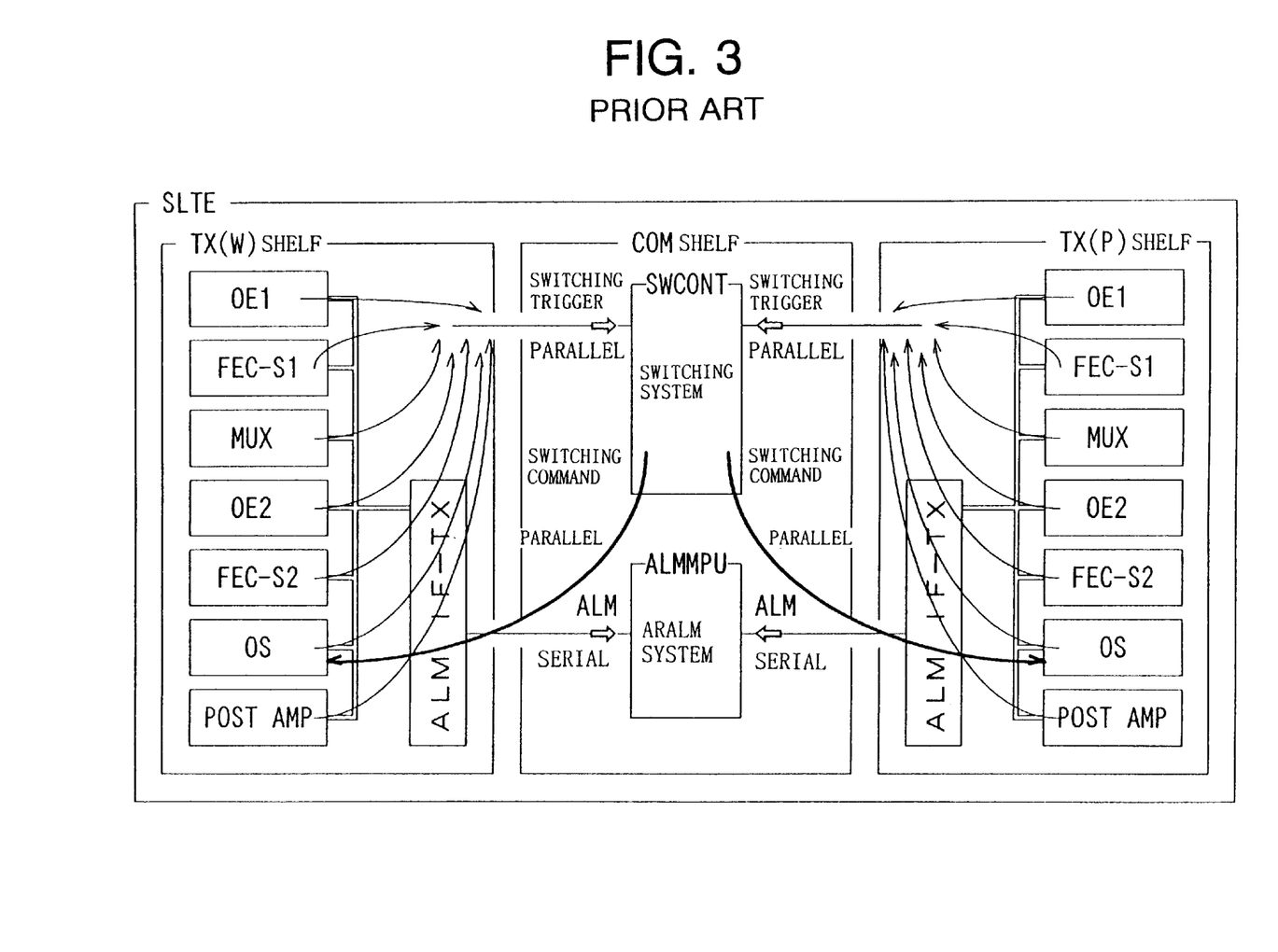
FIG. 3 is a block diagram for describing the switching operation of another type falling into the conventional transmission system.

Additionally, there are two types of SLTEs which differ from each other in that how a signal (switching trigger) is provided to a switching control circuit to start the switching operation. In other words, in one type of SLTE, the alarm is provided directly to a switching control circuit as a switching trigger, while in the other type of SLTE, the alarm is not a direct switching trigger. Referring to FIGS. 2 and 3, the two types of SLTEs will be described in terms of their constructions and operations.

As can be seen in FIG. 2, a COM shelf belonging to one type of STLE in which the alarm is not directly given, as a switching trigger, to a switching control circuit has a SWCONT package constituting the switching control circuit and an ALMMPU package constituting an alarm monitoring circuit. Each TX shelf has some packages for transmission-signal processing and an ALM IF-TX package not only intervening between the SWCONT package and the ALM-MPU package but also operating as described below.

The ALM IF-TX package collects through data bus the alarm outputted in each package, and transfers it to the ALMMPU package. When collecting the alarm. The ALM IF-TX package also determines whether or not a switching trigger is required to be outputted on the basis of the collected alarm as well as the state of the TX shelf itself (i.e., put in operation or not). If the determination is that the output is necessary, the ALM IF-TX package outputs the switching trigger to the SWCONT package. The SWCONT package is configured to send a switching command to both the ALM IF-TX packages when the switching trigger is inputted. In response to the switching command which has been sent from the SWCONT package, the ALM IF-TX packages control a LD of the OS packages connected to them.

On one hand, in the case of the other type of STLE where the alarm is directly given, as a switching trigger, to the switching control circuit, a SWCONT and ALMMPU packages are incorporated in a COM shelf, while an ALM IF-TX package in each TX shelf. Nevertheless, as pictorially shown in FIG. 3, transmission-signal processing packages in each TX shelf and the SWCONT package are connected with each other without being routed to the ALM IF-TX package. As in the SWCONT package, used is a package which concurrently sends an "LD OFF" command (switching command) toward the OS package of the TX shelf in operation and an "LD ON" command (switching command) toward the OS package of the TX shelf put in a standby state, when the alarm is given from the package of the TX shelf in operation.

However, in the STLE shown in FIG. 2, if any failure occurs in the downstream circuit from the LD of the OS package, switching might be carried out with causes (or positions at which the failures occur) against them unknown.

Besides the switching trigger sent from the ALM IF-TX package, the other switching trigger (hereinafter referred to as FERF signal) resultant from the FERF included in the transmission signal is inputted to the SWCONT package. The FERF signal is generated even if failures occur in the downstream circuit from the LD of the OS package. Additionally, the processing carried out during an interval from the occurrence of any failure to the input of the FERF signal to the SWCONT package needs only an interval of a few microseconds, because the processing is done by hardware. But the alarm detecting processing carried out the ALM IF-TX package depends on a CPU, requiring an intervals of tens of milliseconds.

Thus, where the switching is responsive to the FERE signal resultant from failures caused in the downstream circuits from the LD of the OS package, there is a possibility that the switching (i.e., the LD is off) is completed before the alarm detection processing performed by the ALM IF-TX package. If the switching was completed before that, the alarm relating to the LD output will be issued without an actual failure. (The alarm includes "OPT OUT DOWN" from the OS package, and "OPT IN DOWN" and "OPT OUT DOWN" from a POST AMP package.) Therefore, this situation results in unknown causes to the switching.

In the case of the STLE where the alarm is used as a switching trigger, as shown in FIG. 3, the switching processing and the detection processing are carried out at different speeds in a completely independent manner. Thus, in this case, a situation that the switching has been carried out with unknown cause may arise. Specifically, it is unknown whether the alarm, such as "OPT OUT DOWN" from the OS package, truly indicates an actual failure.

The conventional STLE has fear that the switching maybe done with causes unknown.

Furthermore, the conventional SLTE has a problem that the alarm is removed by only reinserting packages whose failure has not been corrected. As described before, in the standby-side TX shelf of which LD is brought into the off state, a few alarms may be issued with no actual failure. Considering this situation, the ALM IF-TX package including a standby-side TX shelf is designed to perform special processing with alarms which have been issued in the off state of the LD placed in the downstream circuits from the LD.

Figure 4:
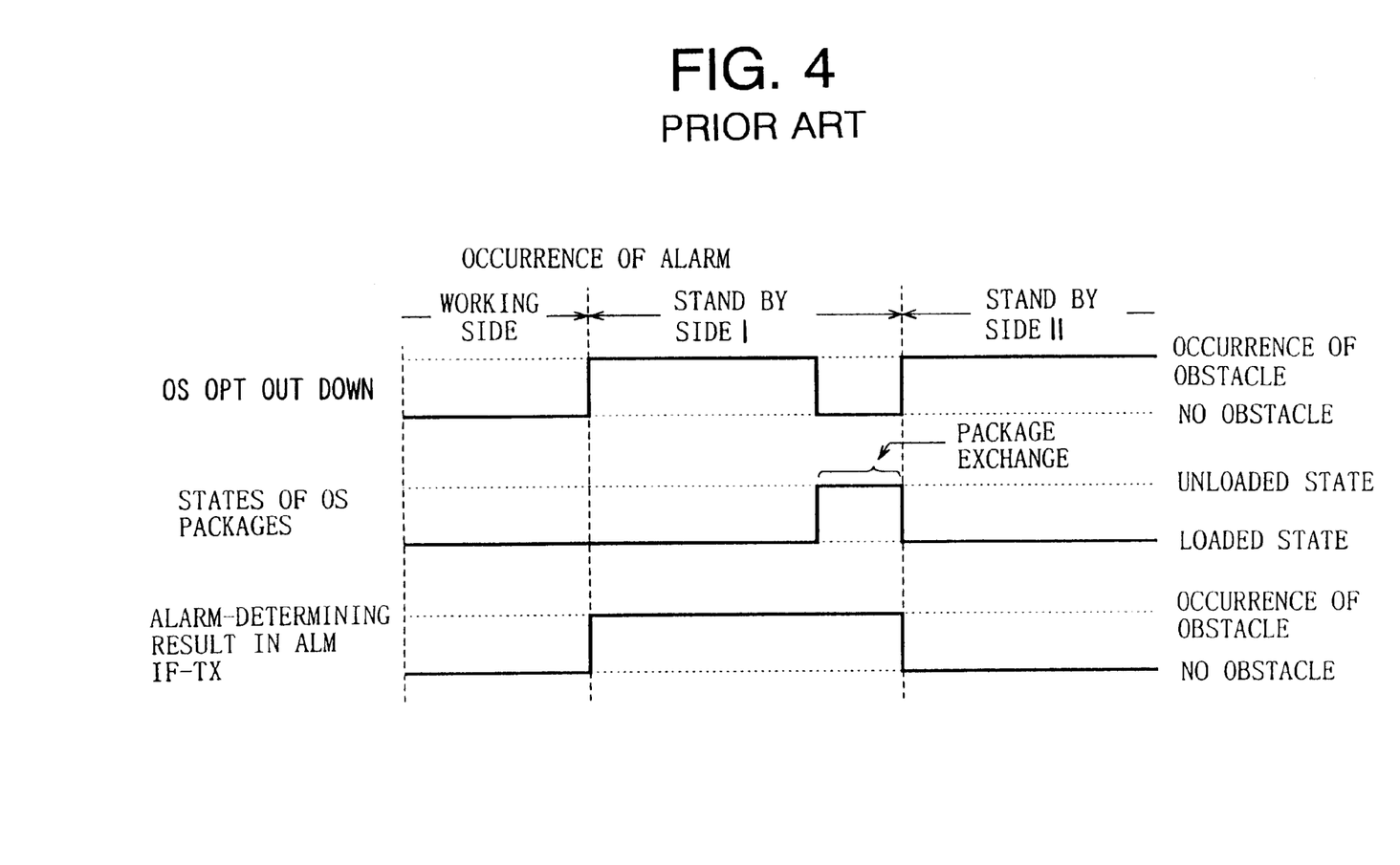
FIG. 4 is a timing chart describing a conventional ALM IF-TX package incorporated in the conventional transmission system.

Specifically, as pictorially shown in FIG. 4, the ALM IF-TX package is configured such that it can recognize that the alarm is just information indicating states of corresponding circuits as during an interval from the switching to the exchange of packages (see "standby side I" in FIG. 4). It is configured that, once another package was reinserted (see "standby side II" in FIG. 4), the ALM IF-TX package determines that the causes of the alarm have been removed (the package has been exchanged to normal one). Thus, in the conventional STLE, only inserting a package in which some failure is generated leads to the removal of the alarm.

Accordingly, it is a first object of the present invention to provide a cold standby type of transmission system where circuit switching is carried out with known causes.

It is a second object of the present invention to provide a cold standby type of transmission system where erroneously recognizing the states of a package is avoidable.

SUMMARY OF THE INVENTION

In order to solve the first object, according to one aspect of the present invention, there is provided a transmission system comprising a first and second transmission-signal processing circuits each of which is configured by combining a plurality of types of packages each having a detecting circuit for detecting an alarm indicative of detection of an failure in each package; a switching control circuit for controlling switching between the first and second transmission-signal processing circuits; a first interface circuit connected with both the first transmission-signal processing circuit and the switching control circuit; and a second interface circuit connected with both the second transmission-signal processing circuit and the switching control circuit. The switching control circuit has an element for receiving a switching trigger signal provided without being routed the first and second interface circuits, the switching trigger corresponding to the alarm, and an element for issuing a switching command toward the first and second interface circuits in response to the reception of the switching trigger signal. And each of the first and second interface circuits has an element for acquiring the alarm output of the detecting circuit of either one of the first and second transmission-signal processing circuits which is connected with either one of the first and second interface circuits in cases where the connected transmission-signal processing circuit is in operation when the switching command is given, the detecting circuit outputting the alarm regardless of generation of the failure if the connected transmission-signal processing circuit is in a standby state, and an element for performing control which makes the connected transmission-signal processing circuit switch into the standby state after the acquisition of the alarm output. In the transmission system thus-configured, in the case that a switching trigger signal different from that sent out based on alarms acquired by the interface circuit is inputted into the switching control circuit, alarms are acquired by the interface circuit prior to circuit switching. Thus, even under a condition that a conventional transmission system might perform its switching with its cause unknown, the transmission system above-configured can do so with its cause known.

It is preferred that each package having the detecting circuit is provided with a holding circuit for holding information corresponding to the alarm even when no power source is supplied to the package, and each of the first and second interface circuits has an element for making the holding circuit hold the alarm output of each paired detecting circuit, an element for performing control which makes the connected transmission-signal processing circuit switch into the standby state after the hold of the alarm output, and an element for determining a condition of each package based on information held by the holding circuit when the connected transmission-signal processing circuit is in the standby state.

According to this preferred configuration, both the first and second objects are accomplished. Furthermore, in order to solve the first object, according to another aspect of the present invention, there is provided a cold standby type of transmission system comprising a first and second transmission-signal processing circuits each of which is configured by combining a plurality of types of packages each having a detecting circuit for detecting an alarm indicative of detection of an failure in each package; a switching control circuit for controlling switching between the first and second transmission-signal processing circuits; a first interface circuit connected with both the first transmission-signal processing circuit and the switching control circuit; and a second interface circuit connected with both the second transmission-signal processing circuit and the switching control circuit. The switching control circuit has an element for receiving the alarm from the package of either one of the first and second transmission-signal processing circuits which is in operation, an element for providing an alarm-detecting command for either one of the first and second transmission-signal processing circuits which is connected with the transmission-signal processing circuit in operation, and an element for performing control which makes the transmission-signal processing circuit in operation switch into a standby state after a given interval starting from providing the alarm-detecting command. And each of the first and second interface circuits has an element for receiving the alarm-detecting command and an element for acquiring the alarm output of each detecting circuit of the plurality of types of packages in either one of the first and second transmission-signal processing circuits which is in operation in response to the alarm-detecting command, the detecting circuit outputting the alarm regardless of generation of the failure if either one of the first and second transmission-signal processing circuits in operation is in the standby state.

In the transmission system thus-configured, when the circuit switching is required, the switching control circuit orders the interface circuit to start acquiring alarms, and waits for a given interval. When the interval terminates, the switching control circuit switches the signal processing circuits between the standby and working sides. Furthermore, even under a condition that a conventional transmission system might perform its switching with its cause unknown, the transmission system above-configured can do so with its cause known.

Preferably, each package having the detecting circuit is provided with a holding circuit for holding information corresponding to the alarm even when no power source is supplied to the package, and each of the first and second interface circuits has an element for making the holding circuit hold the alarm output of each paired detecting circuit.

Therefore, according to this preferred configuration, both the first and second objects are accomplished.

DESCRIPTION OF THE PREFERRED EMBODIMENTS

Referring to the accompanying drawings, preferred embodiments of the present invention will be described.

[First embodiment]

A first embodiment of the present invention will be described with reference to FIGS. 5 to 9.

Figure 5:
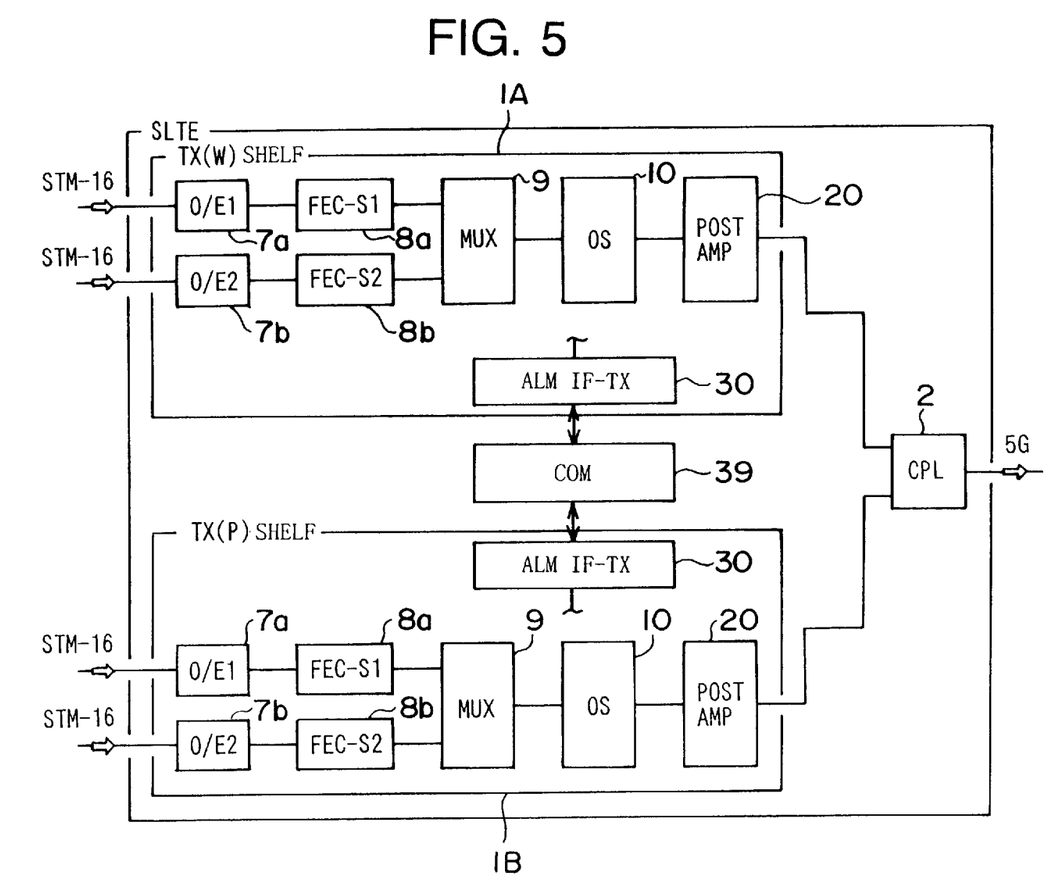
FIG. 5 is a schematic block diagram showing a cold standby type of duplex transmission system according to a first embodiment of the present invention.
Figure 6:
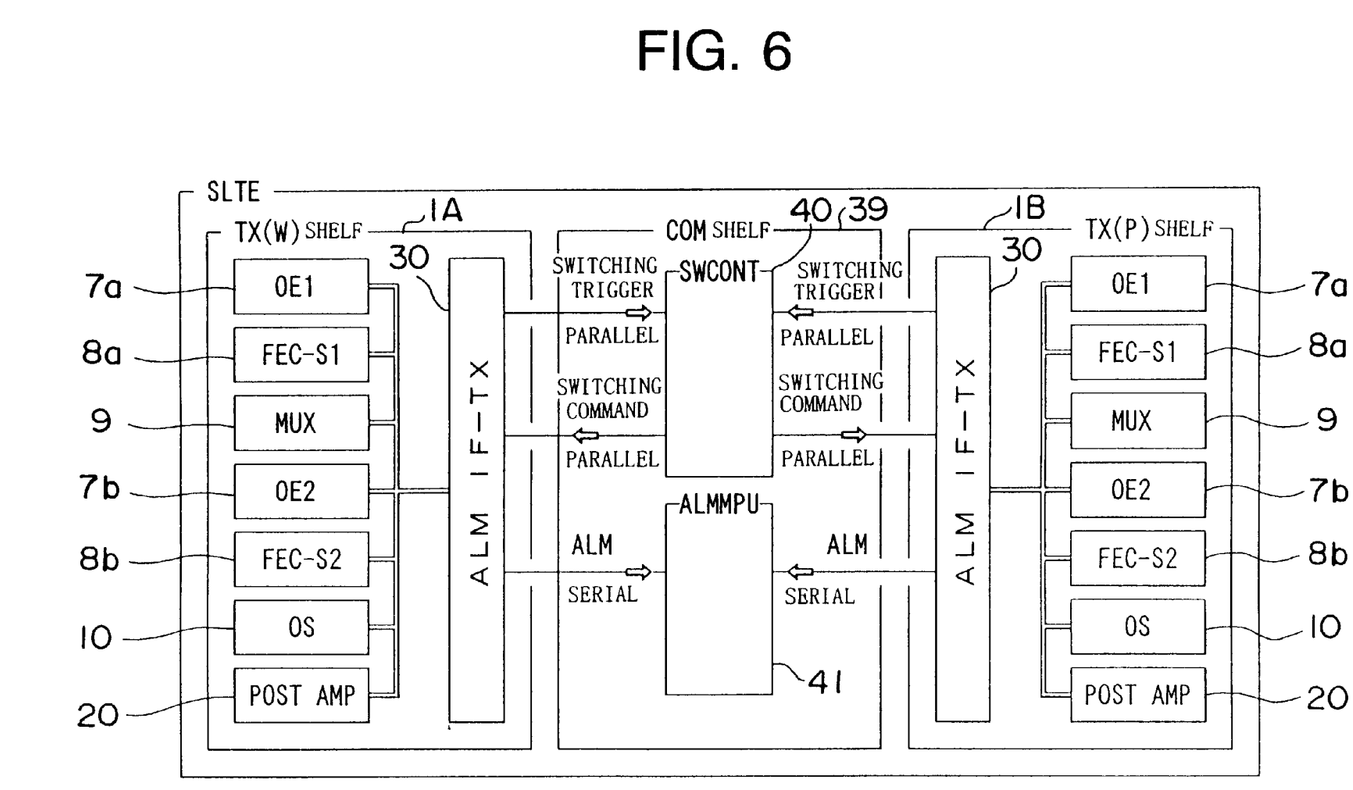
FIG. 6 is a block diagram for describing the switching operation of the transmission system.

A transmission system (SLTE) according to the first embodiment is used for optical communication. As shown in FIGS. 5 and 6, the transmission system comprises signal-processing duplex circuit groups of a TX(W) shelf 1A and TX(P) shelf 1B, CPL shelf 2, and COM shelf 39. Each of the TX(W) and TX(P) shelves 1A and 1B has signal-processing packages including an O/E1 package 7a, O/E2 package 7b, FEC-S1 package 8a, FEC-S2 package 8b, MUX package 9, OS package 10, POST AMP package 20, and ALM IF-TX package 30. The COM shelf 30 intervene between the ALM IF-TX packages 30 of the TX(W) and TX(P) shelves 1A and 1B. The COM shelf 39 comprises a SWCONT package 40 and an ALMMPU package 41, as shown in FIG. 6.

The transmission system of this embodiment differs from the conventional transmission system described in FIGS. 1 and 2 in that only the configuration and operation of the OS package 10, POST AMP package 20, and ALM IF-TX package 30 are altered. Thus, the following description will focus on those altered packages.

Figure 7:
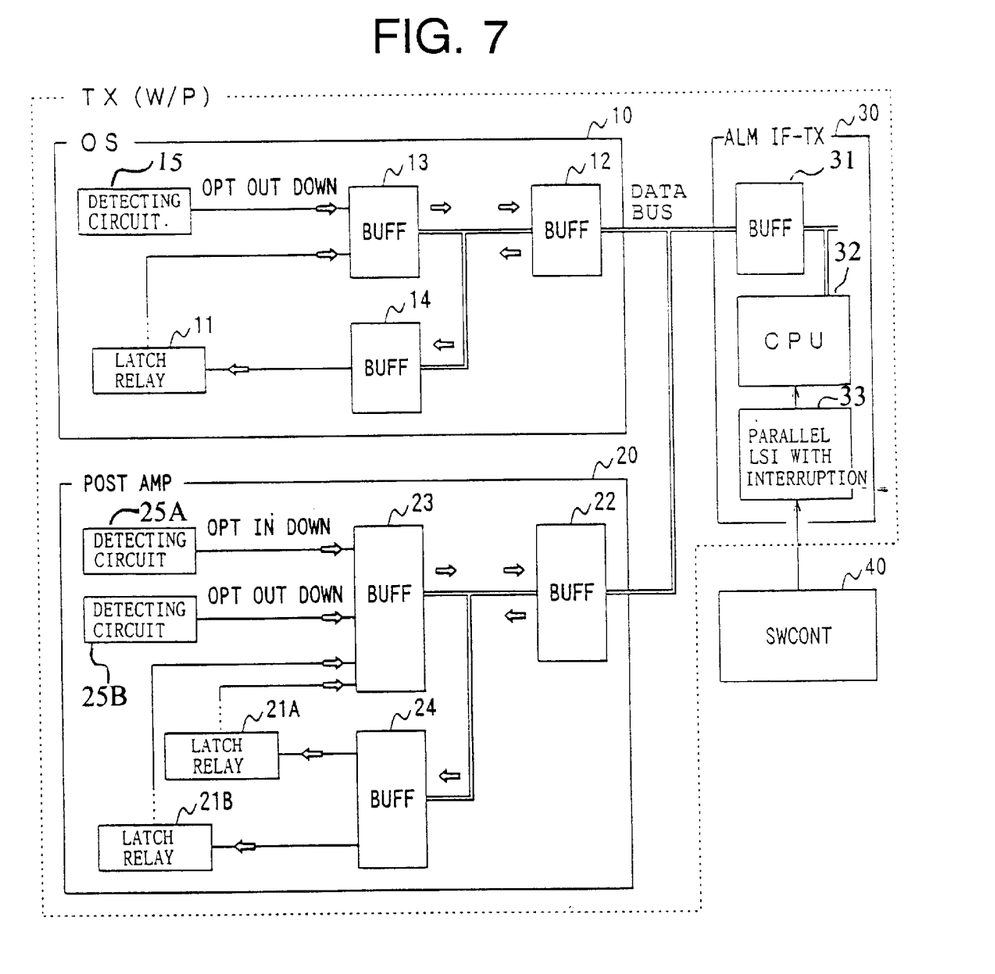
FIG. 7 shows an essential part of TX packages incorporated in the transmission system.

FIG. 7 schematically shows the configurations of an OS package 10, POST AMP package 20, and ALM IF-TX package 30, which are incorporated in each TX package of a transmission system according to the first embodiment.

As shown therein, the OS package 10 is provided with a latch relay 11 and a buffer (BUFF) 12 connected with the ALM IF-TX package 30. The OS package 10 is also provided with a detecting circuit 15, another buffer 13 for temporarily storing either one of alarm outputs (OPT OUT DOWN) from the detecting circuit 15 or data latched by the latch relay 11, and another buffer 14 used in writing either of data stored in the buffer 13 or data stored in the buffer 12 (i.e., data sent from the ALM IF-TX package) into the latch relay 11.

Therefore, the OS package 10 can be summarized such that circuitry centered on the latch relay 11 and used for holding and outputting "OPT OUT DOWN" outputted from the detecting circuit 15 is added to a generally-used known OS package.

The POST AMP package 20 comprises detecting circuits 25A and 25B outputting "OPT IN DOWN" and "OPT OUT DOWN" signals respectively, latch relays 21A and 21B, and three buffers 22–24 connected with each other. Of these buffers, a buffer 22 is connected with the ALM IF-TX package 30, another buffer 23 is connected with both the detecting circuits 25A and 25B and the latch relays 21A and 21B, and another buffer 24 is connected with the latch relays 21A and 21B.

In the case of the POST AMP package 20, as shown therein, circuitry centered on the latch relays 21A and 21B and used for holding and outputting "OPT IN DOWN" and "OPT OUT DOWN" outputted from the two detecting circuits 25A and 25B is added to generally-used known POST AMP packages.

The ALM IF-TX package 30 has a buffer 31, a CPU 32, and a parallel LSI 33 with interruption.

Figure 8:
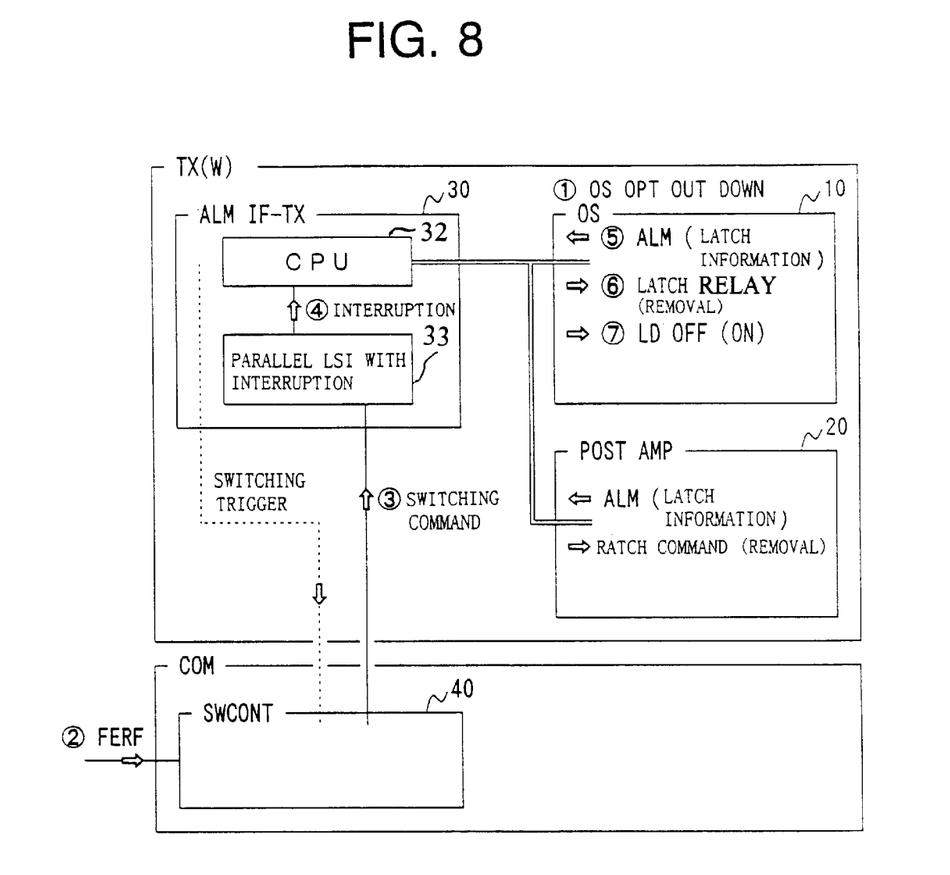
FIG. 8 pictorially shows the operation of the transmission system.
Figure 9:
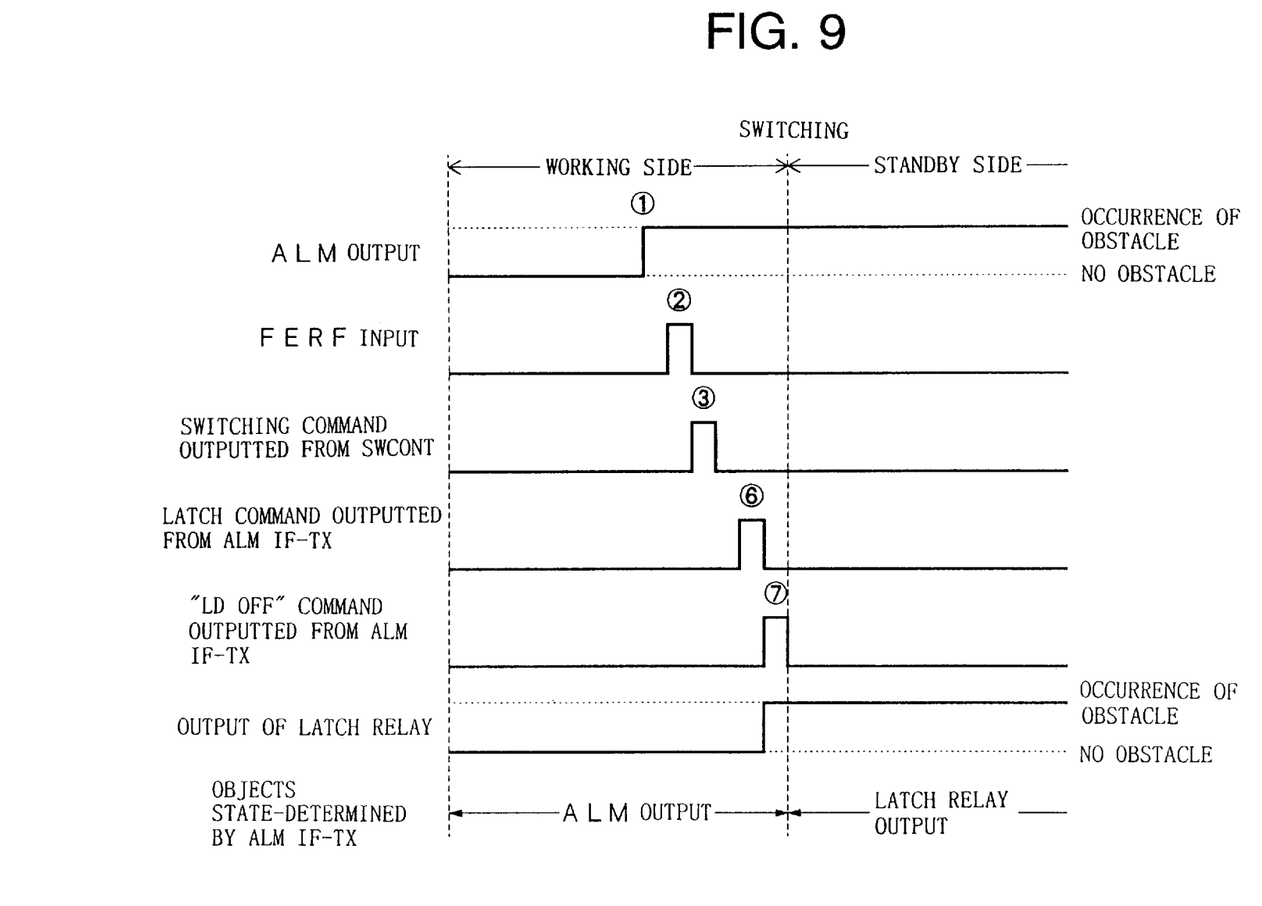
FIG. 9 is a timing chart showing the operation of the transmission system.

Referring to FIGS. 8 and 9, the operation of the transmission system will be described.

As shown in FIG. 8, in this transmission system, if "OPT OUT DOWN" arises in the OS package 10 of the TX(W) shelf in operation (refer to ① in FIG. 8), and an FERF signal is inputted into the SWCONT package 40 (refer to ② in FIG. 8) before the ALM IF-TX package 30 collects the alarm and outputs it as a switching trigger, the SWCONT package 40 outputs a switching command toward the parallel LSI 33 of the ALM IF-TX package 30 (refer to ③ in FIG. 8). The parallel LSI 33 provides the CPU 32 an interruption signal in response to the switching command (refer to ④ in FIG. 8).

Responsively to the interruption signal, the CPU 32 tries to acquire an alarm outputted from the detecting circuit 15 of the OS package 10 (refer to ⑤ in FIG. 8). If the alarm has actually been generated, the CPU 32 controls the OS package 10 so that the alarm output is latched by the latch relay 11 (refer to ⑥ in FIG. 8). Likewise, the same control is done by the CPU 32 toward the POST AMP package 20. The CPU 32 then sends an "LD OFF" command to accomplish the off state of the LD to the OS package (refer to ⑦ in FIG. 8).

That is, the ALM IF-TX package (i.e., the CPU 32) in the transmission system controls, as shown in FIG. 9, the latch relays so as to output the same data as the alarm output to the OS package 10 before issuing the LD OFF command.

The ALM IF-TX package 30 determines whether or not both the OS package 10 and the POST AMP package 20 are in an operable condition. This determination is made based on the alarm output from the each package if the ALM IF-TX package 30 itself belongs to one system side in operation, while the determination is made based on latched information by the latch relay (or relays) of each package if it belongs to the standby system side. In addition, where the ALM IF-TX package 30 belongs to one system side in operation and cannot acquire the alarm output from the detecting circuit (or circuits) because of the latched alarm by the latch relay (or relays), it issues a latch-canceling command toward the latch relay (or relays).

As described above, even under a condition that causes of system switching would be unknown to the conventional transmission systems, the transmission system of the first embodiment is capable of switching systems with the causes clearly recognized. Additionally, using information latched by the latch relay (or relays) of each package, the ALM IF-TX package 30 determines if both the OS package 10 and the POST AMP package 20 are in an operable condition or not, when it belongs to the standby side system. Therefore, if a package having failures is merely reinserted or the power source is reset, no erroneous recognition concerning the states of packages is caused in the transmission system.

[Second embodiment]

Figure 10:
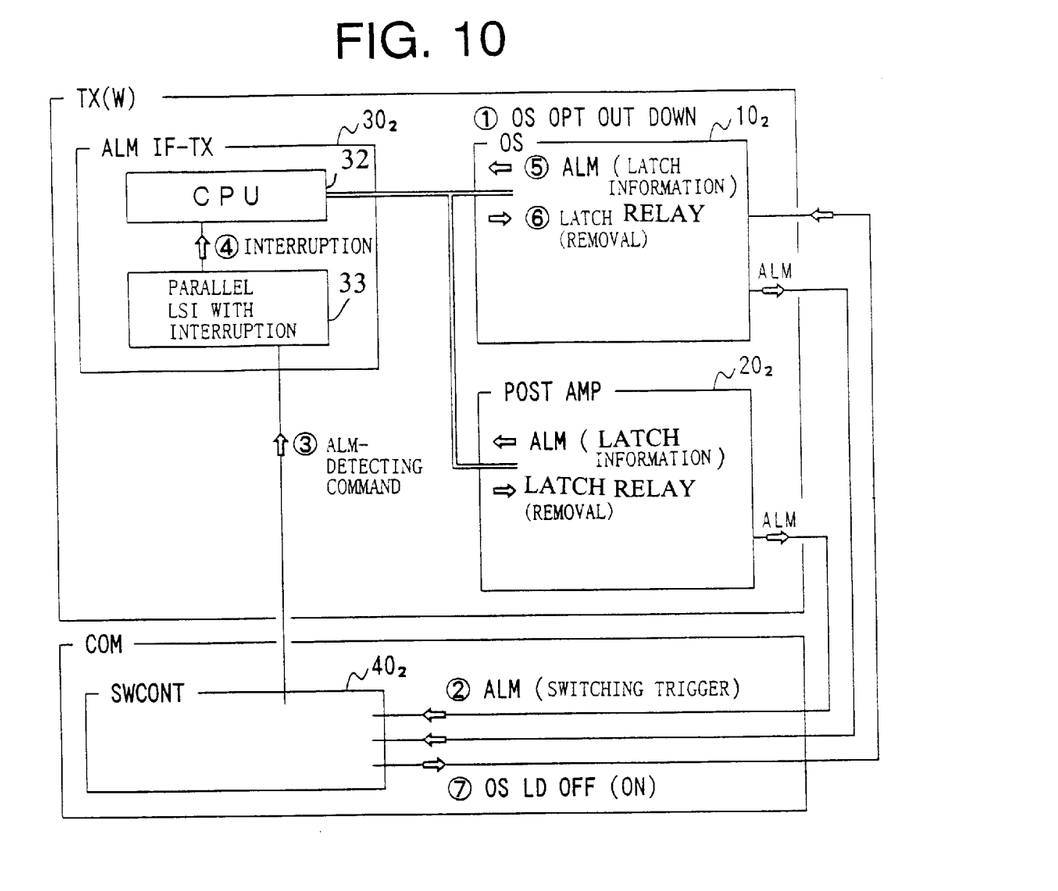
FIG. 10 illustrates the operation of a duplex transmission system of a second embodiment according to the present invention.
Figure 11:
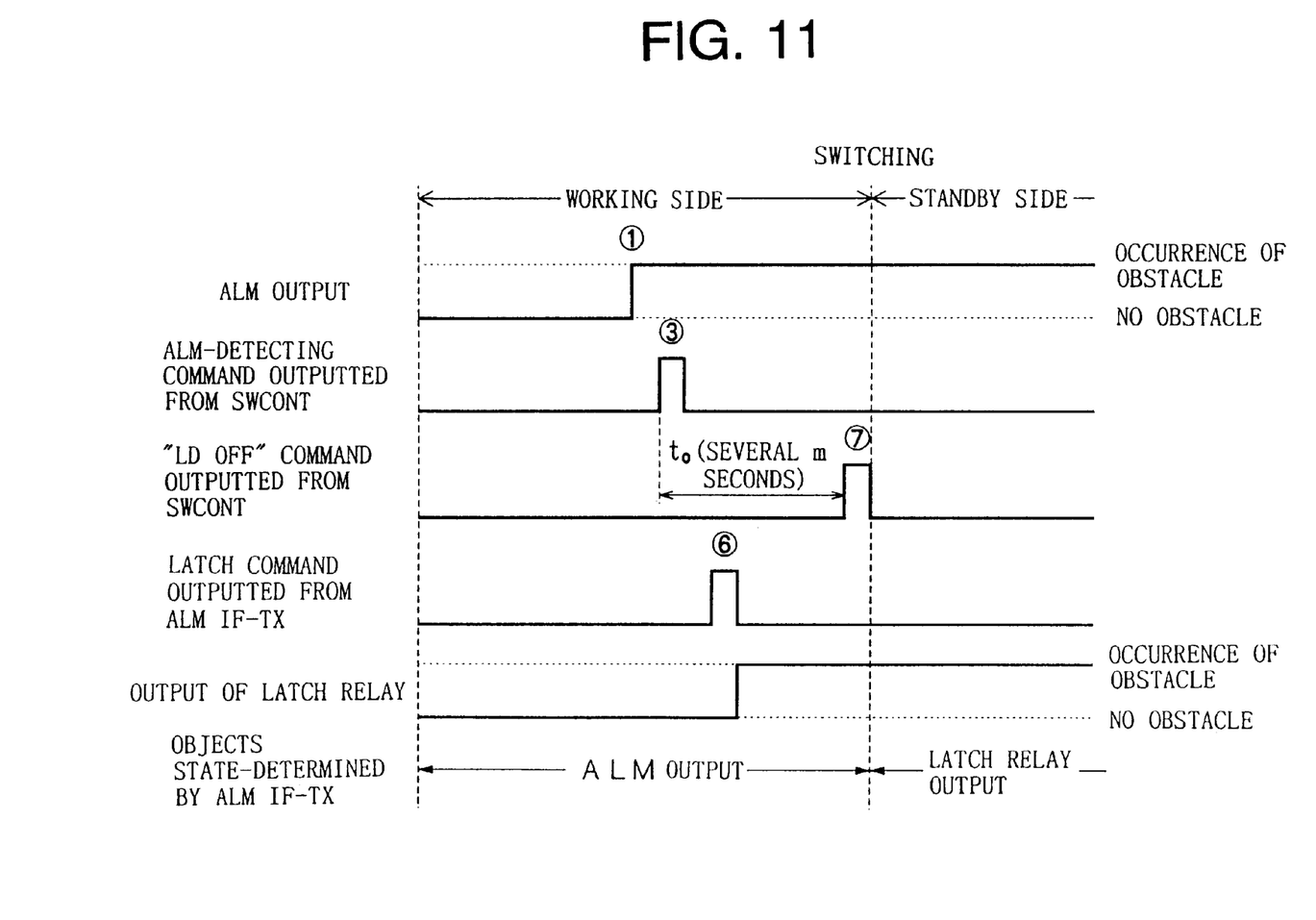
FIG. 11 is a timing chart showing the operation of the transmission system according to the second embodiment.

Referring to FIGS. 10 and 11, a second embodiment of the present invention will be described.

A transmission system of the second embodiment is altered from the foregoing one according to the first embodiment in that each alarm is directly given to the SWCONT package as a switching trigger, as in FIG. 3. In short, the transmission system of the second embodiment also adopts the OS package $10_2$ and the POST AMP package $20_2$ in which the latch relay (or relays) is added. Illustrating the configuration of each package used herein will therefore be omitted.

The operation of the transmission system will be described using FIGS. 10 and 11.

When "OPT OUT DOWN" is generated in the OS package $10_2$ in the TX(W) shelf in operation (refer to ① in FIG. 10), the alarm is directly sent, as a switching trigger, to the SWCONT package $40_2$ (refer to ② in FIG. 10).

The SWCONT package $40_2$ which received the switching trigger outputs an "ALM-detecting" command to the parallel LSI 33 with interruption arranged in the ALM IF-TX package 30 (refer to ③ in FIG. 10). In response to this ALM-detecting command, the parallel LSI 33 provides the CPU 32 an interrupting signal (refer to ④ in FIG. 10).

Responsively to the interruption signal, the CPU 32 tries to acquire an alarm outputted from the detecting circuit 15 of the OS package 102 (refer to ⑤ in FIG. 10) If the alarm has actually been generated, the CPU 32 provides the OS package 102 a latch command designed so that the alarm output is latched by the latch relay 11 (refer to ⑥ in FIG. 10). Likewise, the same control is done by the CPU 32 toward the POST AMP package 202.

After the output of the ALM-detecting command, the SWCONT package 402 outputs an "LD OFF" command to the LD of the OS package 102 to switch the LD into an off-state at a time instant when a given interval t0 has passed (refer to ⑦ in FIG. 10). The interval t0 is determined to appropriately set the output timing of the LD OFF command after the completion of outputting the latch command by the CPU 32 of the ALM IF-TX package.

As described, when the switching trigger is inputted, the SWCONT package 402 makes the ALM IF-TX package 302 acquire alarms, waits for the interval t0 after the output of the alarm-detecting command, then performs control to mutually exchange the two circuit systems. Therefore, even under a condition that causes of system switching would be unknown to the conventional transmission systems, the transmission system of the embodiment is capable of switching systems with the causes clearly recognized.

Like the foregoing ALM IF-TX package 30, the ALM IF-TX package 302 determines whether or not both the OS package 102 and the POST AMP package 202 are in an operable condition. This determination is made based on the alarm output from the each package if the ALM IF-TX package 302 itself belongs to one system side in operation, while the determination is made based on latched information by the latch relay (or relays) of each package if it belongs to the standby system side. Therefore, as in the transmission system of the first embodiment, even when a package having failures is merely reinserted or the power source is reset, no erroneous recognition concerning the states of packages is caused in the transmission system.

The transmission systems described in the foregoing embodiments are possible to be modified into various ways. For example, one modified configuration is that a latch relay (or relays) is omitted from both the OS package and the POST AMP package, and only an alarm (or alarms) is acquired by the ALM IF-TX package. In this modification, since the transmission system has no capability to distinguish reinserting a package having failures from inserting a normal package, it is preferred that the transmission system is configured as in the foregoing embodiments.

Another modification is about an element for holding the alarm (or alarms). Although the foregoing transmission systems use one or more latch relay as such element, any type of element, such as an EEPROM, is available as long as the alarm (or alarms) can be held and outputted with no power source supplied to the package. Still another modification concerns application of the transmission according to the present invention. The foregoing embodiments have been stated about transmission systems for optical communication, but the present invention is applicable to any transmission system, provided it is provided with a package capable of outputting an alarm regardless of generation of failures, when being in a circuit side in operation.

Thus, even under a condition that a conventional transmission system might perform its switching with its cause unknown, the transmission systems described so far can do so with its cause known. Additionally, thanks to arranging the holding circuit into packages, it is prevented that the states of the packages are erroneously recognized. Numerous other modifications and variations of the present invention will be apparent to those skilled in the art in view of the foregoing description. Thus, it is to be understood that, within the scope of the appended claims, the present invention may be practiced other than as specifically described herein above.

I claim:

1. A transmission system comprising:

a first and second transmission-signal processing circuits each of which is configured by combining a plurality of types of packages each having a detecting circuit for detecting an alarm indicative of detection of an failure in each package;

a switching control circuit for controlling switching between the first and second transmission-signal processing circuits;

a first interface circuit connected with both the first transmission-signal processing circuit and the switching control circuit; and a second interface circuit connected with both the second transmission-signal processing circuit and the switching control circuit, wherein the switching control circuit has means for receiving a switching trigger signal provided without being routed the first and second interface circuits, the switching trigger corresponding to the alarm, and means for issuing a switching command toward the first and second interface circuits in response to the reception of the switching trigger signal, and wherein each of the first and second interface circuits has means for acquiring the alarm output of the detecting circuit of either one of the first and second transmission-signal processing circuits which is connected with either one of the first and second interface circuits in cases where the connected transmission-signal processing circuit is in operation when the switching command is given, the detecting circuit outputting the alarm regardless of generation of the failure if the connected transmission-signal processing circuit is in a standby state, and means for performing control which makes the connected transmission-signal processing circuit switch into the standby state after the acquisition of the alarm output.

2. The system of claim 1, wherein each package having the detecting circuit is provided with a holding circuit for holding information corresponding to the alarm even when no power source is supplied to the package, and each of the first and second interface circuits has means for making the holding circuit hold the alarm output of each paired detecting circuit, means for performing control which makes the connected transmission-signal processing circuit switch into the standby state after the hold of the alarm output, and means for determining a condition of each package based on information held by the holding circuit when the connected transmission-signal processing circuit is in the standby state.

3. A cold standby type of transmission system comprising:

a first and second transmission-signal processing circuits each of which is configured by combining a plurality of types of packages each having a detecting circuit for detecting an alarm indicative of detection of an failure in each package;

a switching control circuit for controlling switching between the first and second transmission-signal processing circuits;

a first interface circuit connected with both the first transmission-signal processing circuit and the switching control circuit; and a second interface circuit connected with both the second transmission-signal processing circuit and the switching control circuit, wherein the switching control circuit has means for receiving the alarm from the package of either one of the first and second transmission-signal processing circuits which is in operation, means for providing an alarm-detecting command for either one of the first and second transmission-signal processing circuits which is connected with the transmission-signal processing circuit in operation, and means for performing control which makes the transmission-signal processing circuit in operation switch into a standby state after a given interval starting from providing the alarm-detecting command, and wherein each of the first and second interface circuits has means for receiving the alarm-detecting command and mean for acquiring the alarm output of each detecting circuit of the plurality of types of packages in either one of the first and second transmission-signal processing circuits which is in operation in response to the alarm-detecting command, the detecting circuit outputting the alarm regardless of generation of the failure if either one of the first and second transmission-signal processing circuits in operation is in the standby state.

4. The system of claim 3, wherein each package having the detecting circuit is provided with a holding circuit for holding information corresponding to the alarm even when no power source is supplied to the package, and each of the first and second interface circuits has means for making the holding circuit hold the alarm output of each paired detecting circuit.

* * * * *